United States Patent
Roldan et al.

(10) Patent No.: US 7,205,863 B2
(45) Date of Patent: Apr. 17, 2007

(54) TEMPERATURE AND FREQUENCY EQUALIZER

(75) Inventors: Nelson Roldan, Boca Raton, FL (US); Gene A. Perschnick, Palm Bay, FL (US); Robert J. Blacka, Pennsauken, NJ (US); Alen Fejzuli, Palm City, FL (US)

(73) Assignee: Smith Interconnect Microwave Components, Inc., Stuart, FL (US)

( * ) Notice: Subject to any disclaimer, the term of this patent is extended or adjusted under 35 U.S.C. 154(b) by 186 days.

(21) Appl. No.: 11/107,558

(22) Filed: Apr. 15, 2005

(65) Prior Publication Data

US 2006/0232356 A1   Oct. 19, 2006

(51) Int. Cl.
*H03H 11/24* (2006.01)
(52) U.S. Cl. .................. 333/81 A; 333/28 R; 338/216
(58) Field of Classification Search .............. 333/28 R, 333/81 A, 81 R, 18; 338/216
See application file for complete search history.

(56) References Cited

U.S. PATENT DOCUMENTS 3,569,869 A * 3/1971 Sutton et al. ................. 333/16
4,135,132 A * 1/1979 Tafjord ....................... 333/167

* cited by examiner

*Primary Examiner*—Stephen E. Jones
(74) *Attorney, Agent, or Firm*—Morgan, Lewis & Bockius LLP

(57) ABSTRACT

The present invention is an absorptive-type cable temperature and frequency equalizer that offsets changes in the gain of the other circuit components cables with increases in temperature and/or frequency. The equalizer comprises a temperature variable filter network having component values and a temperature coefficient of resistance that vary over temperature and frequency to produce a desired response. The temperature and frequency equalizer has at least one thick film thermistor connected in series with a quarter wavelength transmission line. The thermistor absorbs forward and reflected signals at lower frequencies.

8 Claims, 5 Drawing Sheets

TEMPERATURE AND FREQUENCY EQUALIZER

CROSS-REFERENCE TO RELATED APPLICATION

A related application is application Ser. No. 11/107,556 for "Wideband Temperature Variable Attenuator," filed simultaneously herewith, the disclosure of which is incorporated herein by reference.

FIELD OF INVENTION

The present invention is directed to a temperature and frequency equalizer and more particularly toward an absorptive-type temperature and frequency variable microwave equalizer operable in the microwave portion of the electromagnetic spectrum.

BACKGROUND OF INVENTION

Variations in temperature can affect component parts of a microwave system causing differences in signal strength at different temperatures and frequencies. Much time, effort and expense has gone into the design of components of such systems in an effort to stabilize them over various temperature and frequency ranges. This has greatly increased the cost of microwave systems that must be exposed to wide temperature ranges.

Rather than attempt to stabilize the signal level of a microwave circuit by optimizing each component part thereof, an alternative strategy is to allow the signal level to vary over temperature and frequency but to stabilize the signal using an attenuator having temperature and frequency dependent attenuation that offsets the temperature and frequency variations in the microwave circuit. Thus, the attenuator solves the stability problem by flattening the linear increase in attenuation or (decrease in gain) with frequency and temperature.

One example of an absorptive-type temperature variable attenuator is the attenuator described in U.S. Pat. No. 5,332,981 entitled, "Temperature Variable Attenuator," which is incorporated herein by reference. Examples of the attenuator of the '981 patent include a Tee attenuator and a Pi attenuator. In each case at least one resistor has a temperature coefficient of resistance (TCR) that is different from that of the others such that the attenuation of the attenuator changes at a controlled rate with changes in temperature while the impedance of the attenuator remains within acceptable levels.

SUMMARY OF THE INVENTION

The present invention is an absorptive-type temperature and frequency equalizer that offsets changes in the gain of the other circuit components with increases in temperature and/or frequency. The equalizer comprises a temperature variable filter network having component values and a temperature coefficient of resistance that vary over temperature and frequency to produce a desired response. The temperature and frequency equalizer has at least one thick film thermistor connected in series with a quarter wavelength transmission line. The thermistor absorbs forward and reflected signals at lower frequencies.

The temperature coeffficient of the thermistor is selected so that the filter network attenuation changes at a controlled rate in either a positive direction or a negative direction with changes in temperature. Substantially any temperature coefficient of resistance can be created for the resistor or resistors by properly selecting and mixing different inks when forming the thick film thermistors.

A particular application of the invention is as a cable equalizer. Coaxial cables are one of the many types of microwave components that have temperature and frequency dependent properties. In particular, coaxial cables have a temperature and frequency dependent insertion loss that increases as the temperature and/or frequency increases. The cable equalizer's characteristic response can be designed to offset such a loss. Moreover, the cable temperature and frequency equalizer's characteristic responses can be created having either a negative temperature coefficient of attenuation or a positive temperature coefficient of attenuation so as to provide a variety of responses to the insertion loss of the cable.

BRIEF DESCRIPTION OF DRAWING

These and other objects, features and advantages of the invention will be more readily apparent from the following Detailed Description in which.

DETAILED DESCRIPTION

Figure 1:
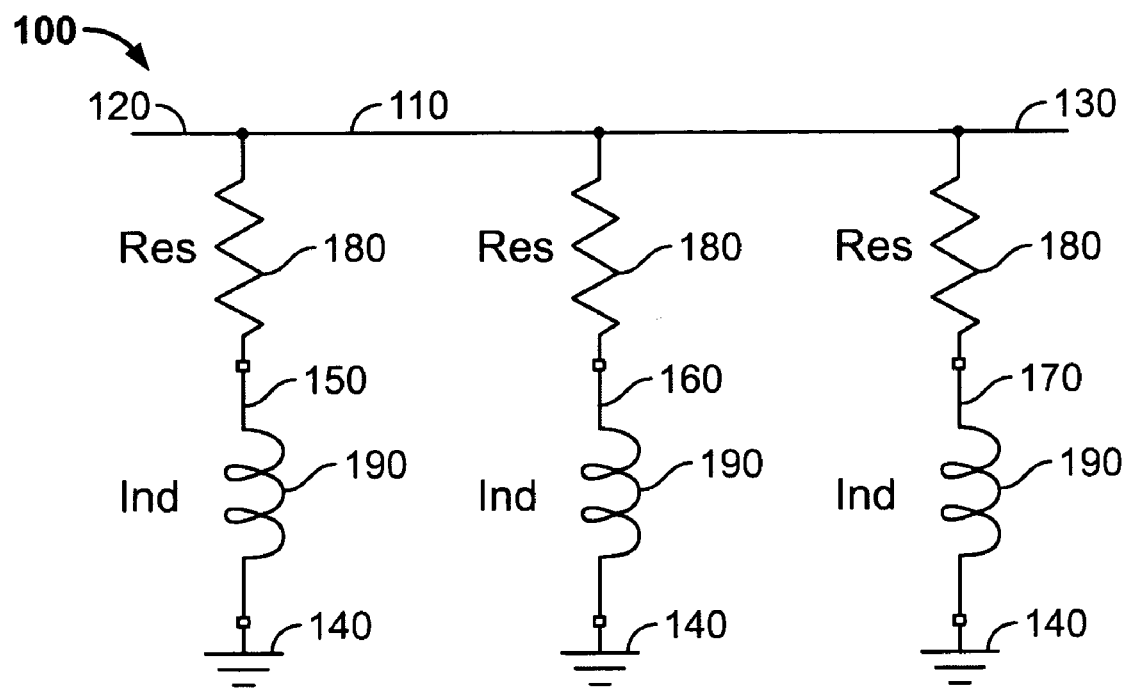
FIG. 1 is a schematic circuit diagram of a preferred embodiment of the invention.

FIG. 1 is a schematic circuit diagram of a preferred embodiment of a temperature and frequency equalizer 100 of the present invention. Equalizer 100 comprises a transmission line 110, extending between an input port 120 and an output port 130, a ground 140, and three shunt elements 150, 160, 170 connected between transmission line 110 and ground 140. Each shunt element comprises a resistor 180 and an inductor 190 connected in series. Resistor 180 in each shunt element is preferably implemented in the form of a thick film thermistor and the inductor is implemented in the form of a quarter wavelength transmission line. Substantially any temperature coefficient of resistance can be created for the resistor by properly selecting and mixing inks when forming the thick film resistor. Each of resistors 180 preferably is a thermistor. In a preferred embodiment, each thermistor has the same temperature coefficient of resistance (TCR) but thermistors with different TCRs may also be used in the practice of the invention.

Figure 2:
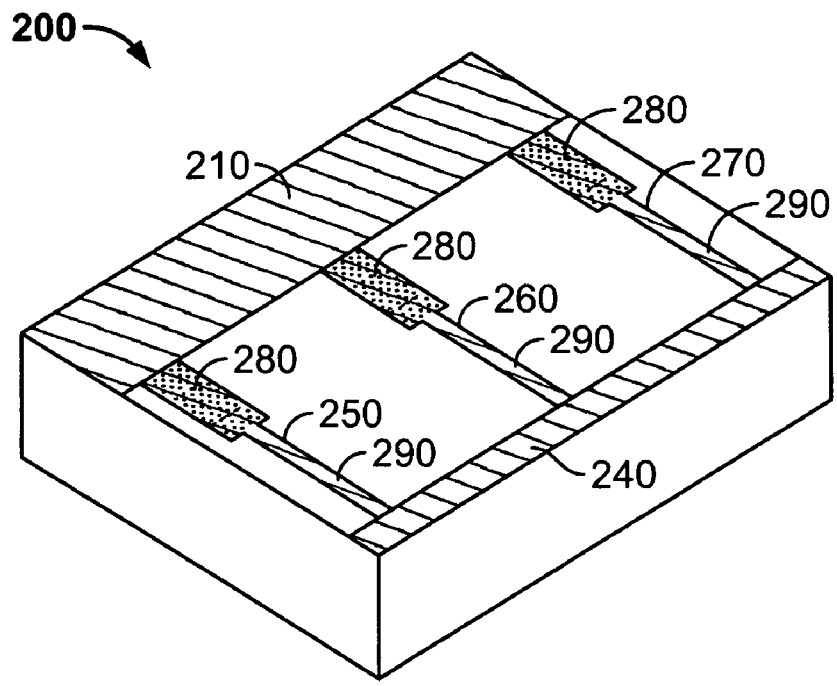
FIG. 2 is a top view of a physical implementation of the embodiment of FIG. 1.

FIG. 2 is a top view of an equalizer 200 that is a preferred implementation of the equalizer 100 of FIG. 1. Equalizer 200 comprises a transmission line 210, a ground 240 and three shunt elements 250, 260, 270 connected between transmission line 210 and ground 240. Preferably, the ground connection is connected to a metallization layer on the opposite side of the equalizer either by a via or a connection on the side of the attenuator. Each shunt element comprises a thick film resistor 280 and a thick film quarter wavelength transmission line 290. The elements of equalizer 200 are preferably formed by printing them on a surface of an insulating substrate 205 such as alumina (AlO) and firing them at an appropriate temperature, typically in the range of 600° C. to 900° C.

In one embodiment, thick film resistors 280 are made from inks formed by combining a metal powder, such as, bismuth ruthenate, with glass frit and a solvent vehicle. This solution is printed on the substrate and then fired. When the resistor is fired, the glass frit melts and the metal particles in the powder adhere to the substrate, and to each other. This type of a resistor system can provide various ranges of material resistivities and temperature characteristics that can be blended together to produce many different combinations.

The resistive characteristics of a thick film ink are specified in ohms-per-square (Ω/□). A particular resistor value can be achieved by either changing the geometry of the resistor or by blending inks with different resistivity. The resistance can be fine-tuned by varying the fired thickness of the resistor. This can be accomplished by changing the deposition thickness and/or the firing profile. Similar techniques can be used to change the temperature characteristics of the ink.

The temperature coefficient of the resistive ink defines how the resistive properties of the ink change with temperature. The Temperature Coefficient of Resistance (TCR) is often expressed in parts per million per degree Centigrade (PPM/C). The TCR can be used to calculate directly the amount of shift that can be expected from a resistor over a given temperature range. Once the desired TCR for a particular application is determined, it can be achieved by blending appropriate amounts of different inks. As with blending for sheet resistance, a TCR can be formed by blending two inks with TCR's above and below the desired TCR. One additional feature of TCR blending is that positive and negative TCR inks can be combined to produce large changes in the TCR of the resulting material.

Some thermistors exhibit a resistance hysteresis as a function of temperature. If the temperature of the resistor is taken beyond the crossover point at either end of the hysteresis loop, the resistor will retain a memory of this condition. As the temperature is reversed, the resistance will not change in the same manner observed prior to reaching the crossover point. In one embodiment, to avoid this problem, the inks used in producing a temperature variable attenuator are selected with crossover points that are beyond the typical operating range of −55 deg. C. to 125 deg. C.

Figure 3:
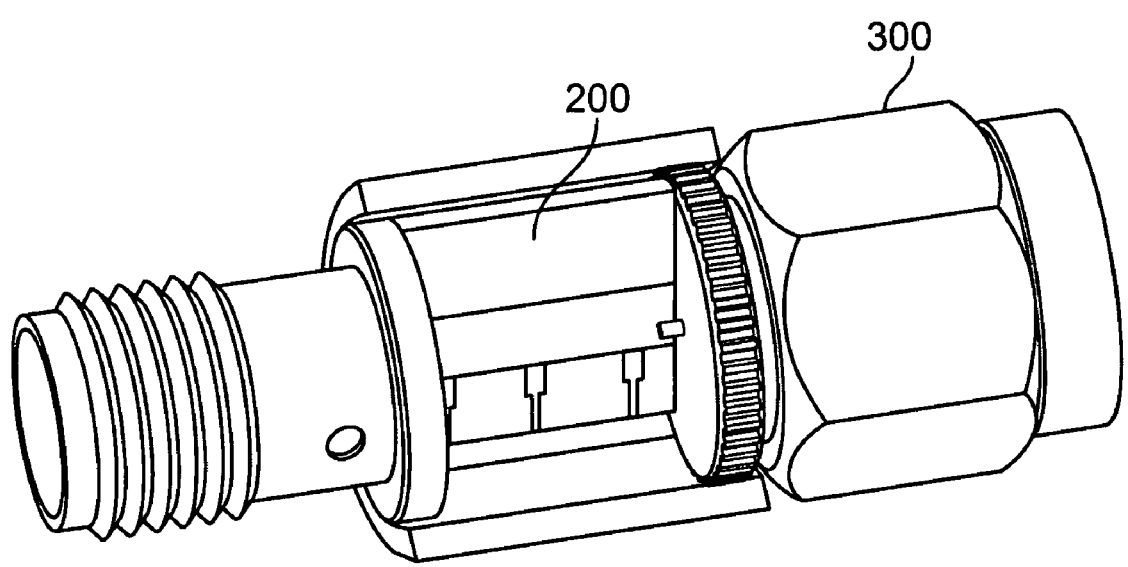
FIG. 3 is a perspective view of the device of FIG. 2 mounted in a coaxial cable connector.

Equalizer 200 is small enough to fit inside a conventional coaxial cable connector. FIG. 3 depicts the placement of an equalizer 200 is a conventional coaxial cable connector 300 connected to the center conductor of the cable. In a typical application, the sheath of the cable is connected to the ground connection of the equalizer on the back side of the equalizer.

Figure 4:
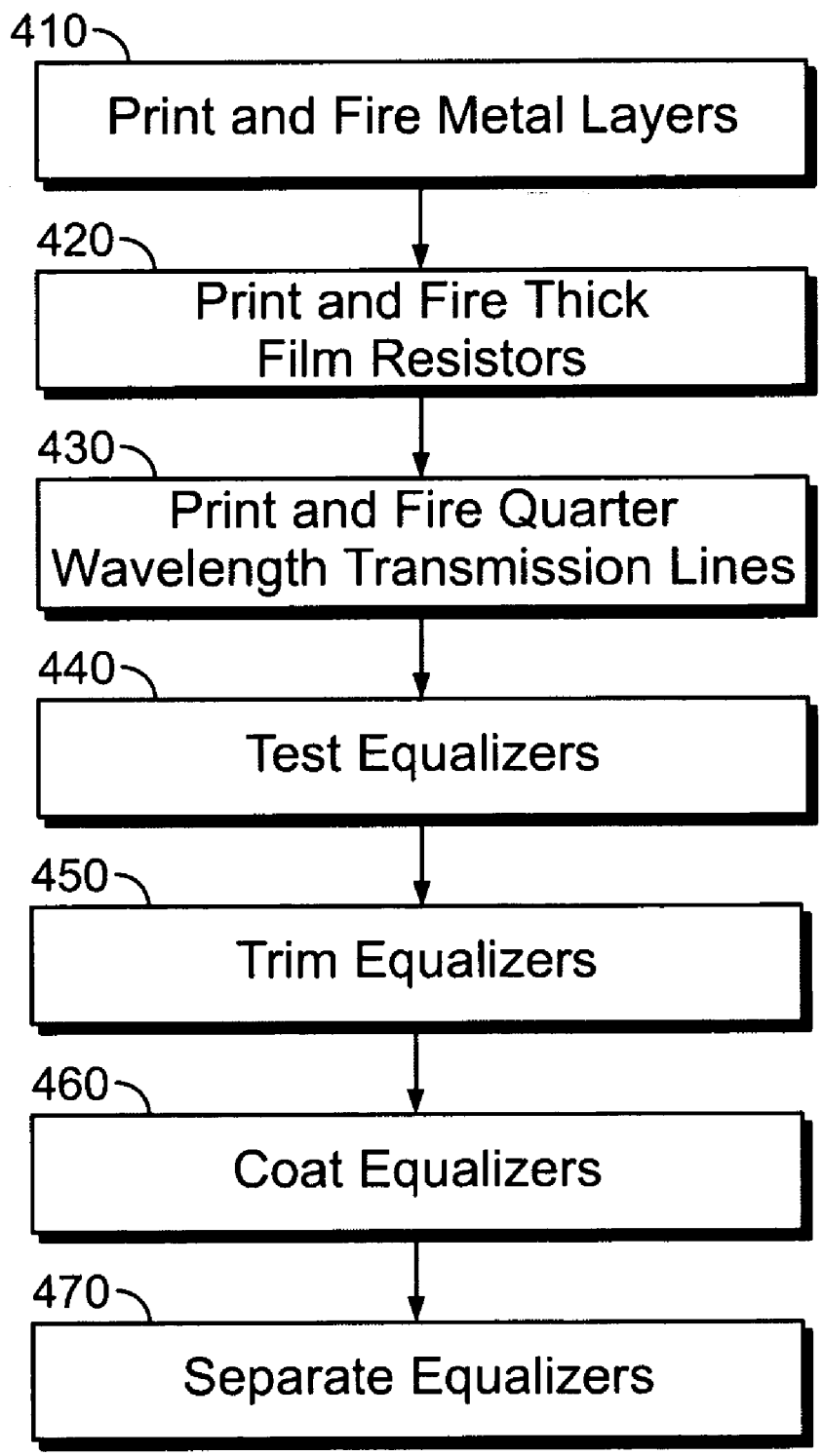
FIG. 4 is a flow chart depicting steps for the formation of the implementation of FIG. 2.

Advantageously, numerous equalizers are made simultaneously by printing the transmission lines, ground, resistors and stubs on an insulating substrate in a process depicted in FIG. 4. Illustratively, the substrate measures 4.5 inches by 4.5 inches and is approximately 0.015 inches thick. To maximize the number of equalizers that are formed at the same time, the equalizers are aligned on the substrate in a rectangular array. At step 410, metal layers are printed on the substrate and fired to form the transmission line and ground. At step 420 the thick film resistors are printed and fired; and at step 430 the quarter wavelength transmission lines are printed and fired. The individual equalizers are then tested at step 440 to determine the resistance and inductance of the resistors and stubs; and these elements are then laser-trimmed at step 450 to meet specifications. The equalizers are then coated with a protective coat at step 460 and labeled with the manufacturer's identification and part number; the substrate is scribed; and the individual equalizers are detached from the substrate at step 470.

Figure 5:
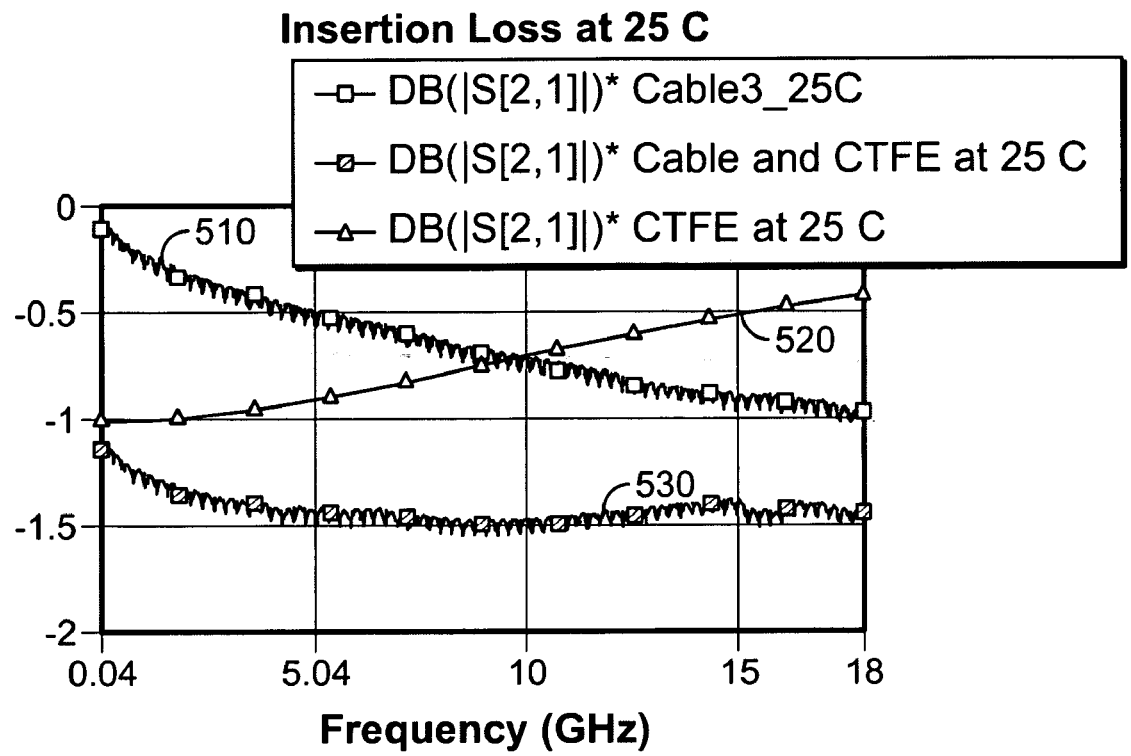
FIGS. 5, 6 and 7 are plots of the insertion loss with frequency of a conventional coaxial cable, of the equalizer of the present invention, and of the combined coaxial cable and equalizer at different operating temperatures.
Figure 6:
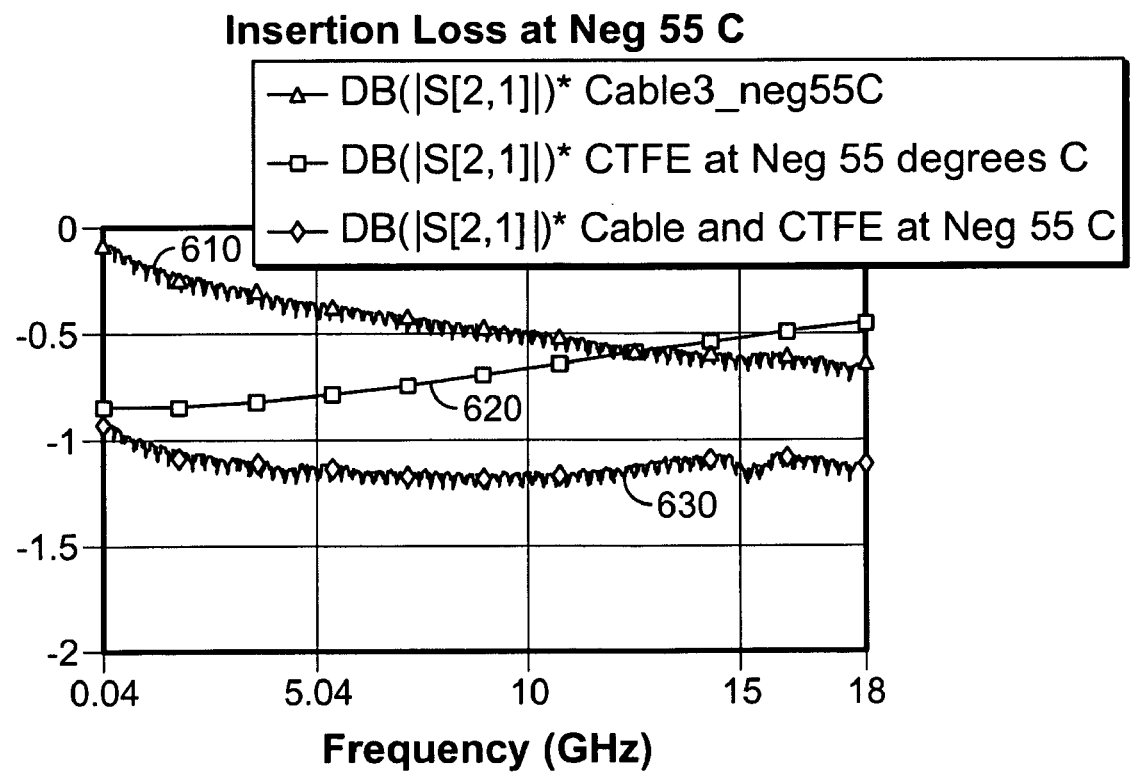
Figure 7:
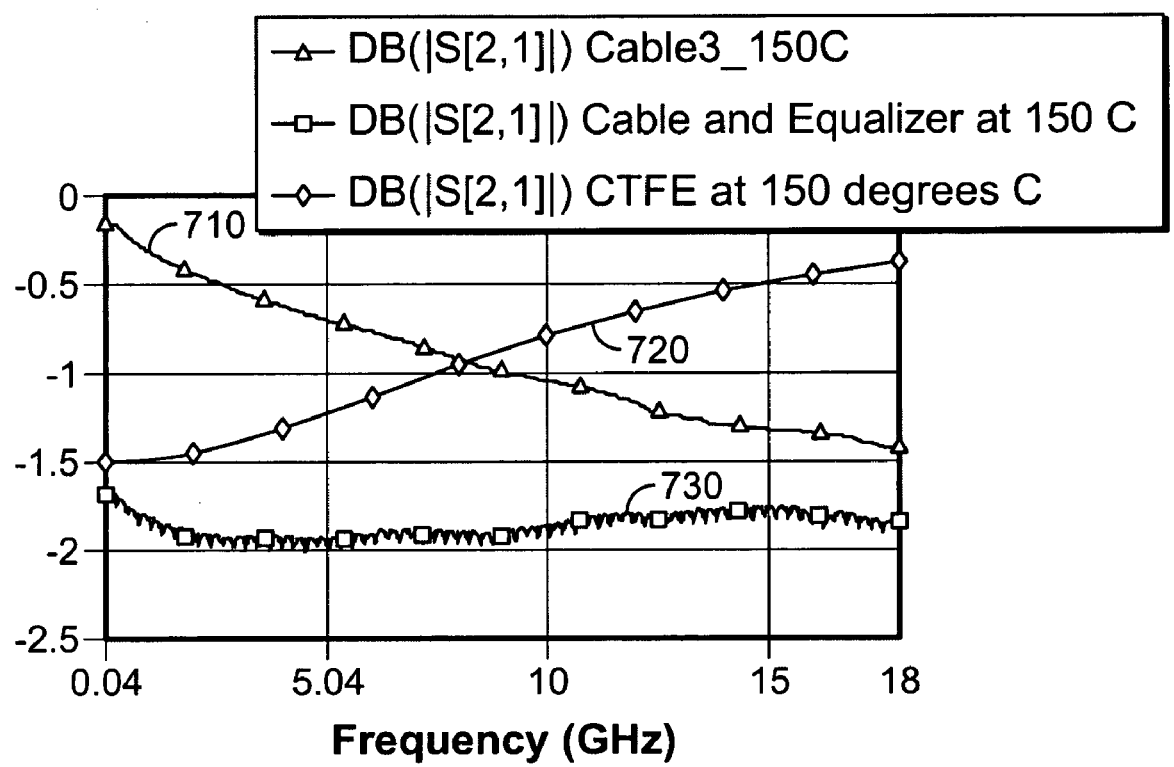

FIGS. 5, 6 and 7 are plots of insertion loss versus frequency at different temperatures that demonstrate the advantages of the present invention. In FIG. 5, plot 510 descending from the upper left hand corner depicts the insertion loss in decibels for conventional coaxial cable over the frequency range from 40 MHz to 18 GHz at a temperature of 25° C. As indicated, the loss goes from nearly zero to 1 deciBel over that range. Plot 520, depicts the attenuation of an equalizer of the present invention over that same range at 25° C. and indicates that it rises at a substantially constant slope from a loss of 1 deciBel at 40 MHz to a loss of less than 0.5 deciBels at 18 GHz. Plot 530 depicts the attenuation of a conventional coaxial cable that has been modified to include the equalizer of the present invention. As indicated, the loss of this combination increases from about 1.1 deciBels at 40 MHz to about 1.5 deciBels at about 3.0 GHz and is pretty much constant at 1.5 deciBels from 3.0 GHz to 18 GHz.

FIGS. 6 and 7 are similar plots at temperature at temperatures of −55° C. and 150° C. Again, the attenuation rises at a substantially constant slope as shown by plots 620 and 720 and the combination of the cable and the equalizer produces an insertion loss shown by plots 630 and 730 that is substantially constant from about 3.0 GHz to 18 GHz.

The present invention may be implemented in a variety of forms without departing from the spirit and scope of the invention. For example, thin-film resistors can be used in place of thick-film resistors. A variety of insulating substrates such as beryllium oxide (BeO), aluminum nitride (Aln), CVD diamond and glass-epoxy may be used in place of alumina. In addition, low temperature co-fired ceramic may also be used as the substrate. The invention may also be practiced using a variety of different circuits in place of the resistor and indicator shunt disclosed in FIGS. 1 and 2. A capacitor could be added in either series with the resistor and conductor or in parallel with the resistor. Alternatively, a parallel combination of a resistor and capacitor could be placed in series between the input port and the output port, in place of a series connection of a resistor and inductor in shunt.

What is claimed is:

1. An equalizer comprising:
 a transmission line and ground, and at least one shunt element connected between the transmission line and ground and comprising a thermistor and a quarter wavelength transmission line connected in series, the thermistor having a temperature coefficient of resistance such that the equalizer provides an attenuation that has a substantially constant slope with increasing frequency.

2. The equalizer of claim 1 wherein the thermistor is a thick film resistor.

3. The equalizer of claim 1 wherein the thermistor is a thin-film resistor.

4. The equalizer of claim 1 comprising three shunt elements connected between the transmission line and ground, each comprising a thermistor and a quarter wavelength stub connected in series.

5. In combination, a cable equalizer and a coaxial cable having a center conductor and a grounding sheath, the cable equalizer comprising, a transmission line connected to the center conductor,
a ground connected to the grounding sheath, and
at least one shunt element connected between the transmission line and ground and comprising a thermistor and a quarter wavelength transmission line connected in series, the thermistor having a temperature coefficient of resistance such that when the equalizer is connected to a coaxial cable, the coaxial cable has a substantially constant insertion loss at microwave frequencies in excess of about 3 GHz.

6. The equalizer of claim 5 wherein the thermistor is a thick film resistor.

7. The equalizer of claim 5 wherein the thermistor is a thin-film resistor.

8. The equalizer of claim 5 comprising three shunt elements connected between the transmission line and ground, each comprising a thermistor and a quarter wavelength stub connected in series.

* * * * *